Patented Aug. 20, 1940

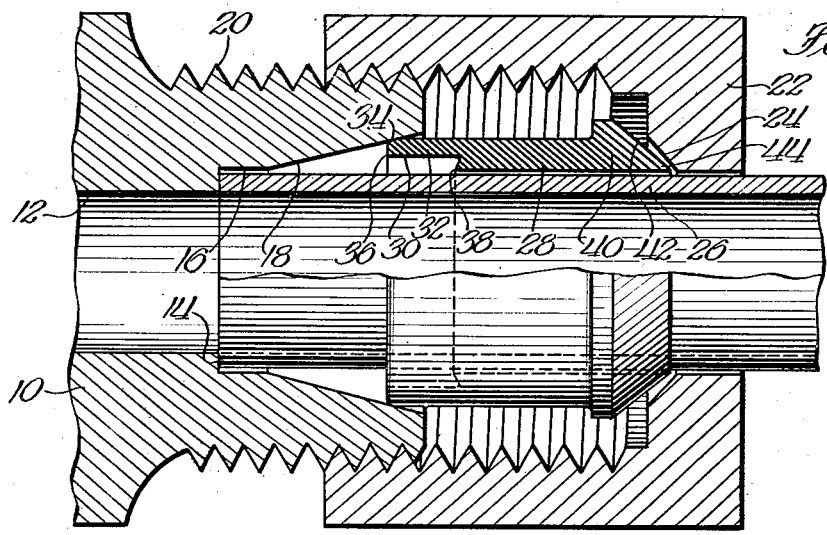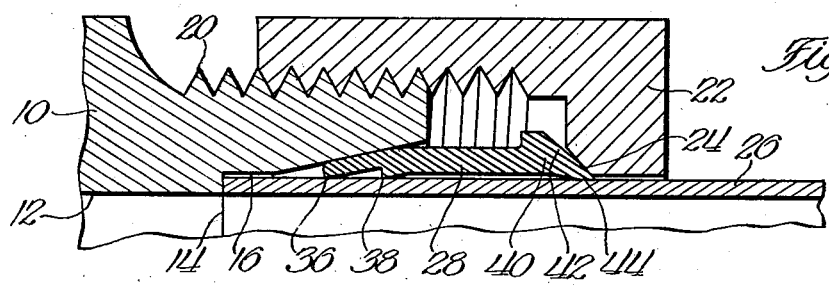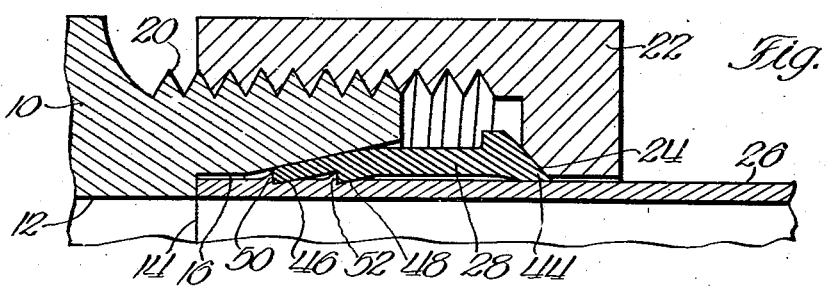

2,211,856

UNITED STATES PATENT OFFICE 2,211,856

PIPE COUPLING

Hans Kreidel, Wiesbaden, Germany, assignor to Patex Societe Anonyme, Basel, Switzerland, a corporation of Switzerland Application February 20, 1937, Serial No. 126,751
In Germany July 27, 1936

2 Claims. (Cl. 285—122)

My invention relates generally to couplings for pipes and tubes, and more particularly to improvements in couplings of the type shown in my copending application, Serial No. 695,077, filed October 25, 1933, Patent No. 2,139,413, dated December 6, 1938.

In the coupling disclosed in the aforesaid application, the mechanical gripping and sealing of the parts was effected by means of a sealing ring which was contracted about the pipe or tube while being moved longitudinally with respect thereto, and causing the inner edge to cut into the outer wall of the pipe or tube and form an annular ridge-like shoulder against which the ring was held to grip the pipe and form a seal which would be tight under high fluid pressure, even when subjected to vibration and other mechanical strains.

When using the coupling disclosed in the aforesaid application with extremely thin walled tubing or with pipe or tubing made of very soft metals, it is desirable to increase the mechanical grip of the sealing ring upon the tube without cutting deeply into the tube, and without contracting the tube or otherwise altering the smooth cylindrical surface of the bore of the tube.

The object of the present invention is to provide an improved form of coupling of the above described type, which may be effectively used in making joints in, or connections with tubing having very thin walls or with tubing made of very soft metals.

Other objects will appear from the following description, reference being had to the accompanying drawing, in which:

Fig. 1 is a longitudinal sectional view of the coupling parts, the tube and sealing ring being shown in quarter-section, the parts being shown in position ready for assembly.

Fig. 2 is a longitudinal quarter-sectional view showing the parts at an intermediate stage of assembly, and also illustrating the sealing ring in the form in which it may be manufactured.

Fig. 3 is a longitudinal quarter-sectional view showing the completed coupling joint.

According to my present invention, the sealing ring or sleeve is so constructed that as the coupling connection is made, two or more cutting edges at or near the leading end of the ring or sleeve will cut into the wall of the tubing to form a double grip and seal.

The coupling is illustrated as comprising a coupling body 10, which may be a part of a machine or apparatus, or may be the body of a union or other pipe fitting. The body is provided with a fluid-conducting bore 12 which terminates at a shoulder 14 in a short counterbore 16, and has a frusto-conically flaring mouth 18 leading to the counterbore.

The body has external threads 20, to receive an internally threaded cap nut 22 which may be hexagonal or of other non-circular shape. The nut has an internal frusto-conical or flared surface 24. The tube or pipe 26 to be coupled to the body 10 is of substantially the same internal bore as the body 10 and is inserted in the counterbore 16 with its end in abutment with the shoulder 14.

A sealing or packing ring or sleeve 28 surrounds the tube 26 and is located between the body 10 and nut 22. Ordinarily, this sealing sleeve will be made of substantially the same kind of metal as the tube 26 with which it is to be used. It is, however, preferably made of slightly harder material or may have parts thereof work-hardened as will hereafter appear. For most uses it is desirable to make the sleeve of a metal which is electrolytically inert with respect to the metal of which the tube or pipe is composed. For copper or brass tubing, the sleeve may be of a suitable brass; for aluminum tubing, aluminum or duralumin; for wrought iron, cast iron and steel pipe and tubing, a suitable grade of steel which is slightly harder than the material of the pipe or tube.

The ring or sleeve 28 has a counterbore or annular recess 30 formed in its forward or leading end, thus forming a relatively thin hollow cylindrical extension 32. The outer edge 34 of this extension is slightly rounded or chamfered so that it will not cut into the frusto-conical surface 18 of the body, while the inner annular edge 36 of the extension is relatively sharp, to form a cutting edge. The edge 38 at the inner end of the counterbore 30 is likewise relatively sharp. If the sealing sleeve 28 is not made of a metal which is slightly harder than that of the pipe or tube with which it is to be used, the edges 36 and 38 are preferably made slightly harder by a suitable work-hardening process.

The rearward end of the sleeve 28 has a portion 40 of slightly enlarged diameter. The outer end of the sleeve 28 has a frusto-conical or beveled surface 42 which is substantially complemental to the surface 24 of the nut 22 and is adapted to be engaged thereby. The surface 24 may be made with a slightly greater included angle than the surface 42, so that the rearward edge 44 of sleeve portion 40 will be engaged first by the nut 22.

In Fig. 2 the parts are shown after the nut 22 has been partly screwed upon the body 10. The extension 32 has been radially contracted by being forced into the tapering mouth 18 of the body, to bring the cutting edge 36 into engagement with the wall of the tube 26. Similarly the cutting edge 38 has been contracted substantially to the diameter of the tube. The rearward edge 44 of the sealing ring has also been contracted and is in frictional engagement with the tube.

Upon further tightening of the nut 22 upon the body 10, the sleeve 28 will be forced further into the flared mouth 18, further contracting the leading end thereof and pressing the cutting edges 36 and 38 into the tube. The edges will be moving longitudinally with respect to the tube so that they will shear into the surface of the tube at an angle. That is, the paths of the cutting edges 36 and 38 will, as the coupling nut is screwed tight, define conical surfaces, and thus form annular grooves 46, 48 of saw-tooth cross-section in the outer surface of the tube. Substantially all of the metal from the grooves will be displaced forwardly and form ridges 50, 52 ahead the cutting edges, and there will be no appreciable deformation of the inner surface of the tube.

As shown in Fig. 3, the joint is completed. A double seal is formed between the sleeve and tube by the generally radial surfaces at the cutting edges pressing against the corresponding surfaces of the grooves 46, 48 and ridges 50, 52. The seal between the body 10 and the sleeve is formed by the pressure of the outer conical surface of sleeve with the tapering surface 18. The rearward edge 44 of the sleeve is contracted into firm contact with the tube so as to maintain a tight mechanical frictional grip upon it. This grip upon the tube is sufficiently tight to prevent or minimize the transmission of shocks to the sealing surfaces. Because of the fact that the ends of the sleeves are radially contracted and the sleeve longitudinally compressed, the sleeve acts as spring lock washer between the nut 22 and body 10 to prevent the latter from becoming loose when the joint is subjected to vibration.

As previously stated, the sleeve 28 as shown in Fig. 2, may be initially formed in the shape shown in Fig. 2, or more properly of the shape shown in Fig. 1, with the exception that the extension 32 will be bent inwardly as indicated in Fig. 2 with its cutting edge 36 of the same diameter as that of the cutting edge 38. When the sleeve is thus preformed, more nearly to the shape it is to assume in the completed joint, less power and effort is required to make the joint since the nut 22 will be capable of being turned freely until just prior to the time that the leading portion of the sleeve is contracted inwardly to bring the cutting edges 36, 38 into contact with the external surface of the tube.

In both embodiments of the invention, the sleeve 28 is preferably made of a metal which is slightly harder than that of the tube. If made of the same metal as the tube, it may be case hardened or work hardened in such manner that the cutting edges 36, 38 are sufficiently hard to be capable of shearing the metal of the tube, and yet retain sufficient ductility that the sleeve will contract as it is forced into the flaring mouth 18 of the body.

The completed joint shown in Fig. 3 may be disconnected an indefinite number of times and reassembled without affecting the efficacy of the seal obtained. Of course when the nut 22 is unscrewed to disconnect the tube 26 from the body 10, the sleeve 28 will remain secured to the tube due to the fact that the cutting edges 36, 38 are embedded in the annular grooves 46, 48. If the nut is drawn up farther than indicated in Fig. 3, the grooves 46, 48 will be cut somewhat deeper than shown in Fig. 3 and the ridges 50, 52 will be correspondingly increased in size.

The completed joint is very effective in resisting mechanical strains placed upon the tube. Edge 44 and adjacent portions which are pressed into contact with the outer surface of the tube form an effective grip to hold the tube against bending strains which may be imposed upon it, while the substantially radial shoulders adjacent the cutting edges 36, 38 by their engagement with the substantially radial surfaces of the grooves 46, 48 form positive means for resisting longitudinally directed pulling forces applied to the tube.

The coupling of my invention may be used effectively with welded tubing, since the edges 36, 38 will cut into the surface of the tube to a depth greater than the groove of the weld seam. Similarly, an effective joint may be formed with tubing which is slightly out of round and tubing the external surface of which is irregular due to the presence of scale or which is not smooth for any other reason.

The coupling may be used with very thin wall pipe and tubing of substantially all the commercial sizes and of the various different metals and alloys used for tubing, such as copper, brass, wrought iron, steel, stainless steel, aluminum, and duralumin. It has been found that the coupling of my invention will withstand fluid pressure in excess of that which will be withstood by the tube itself, and that likewise when tested to destruction for its resistance to vibratory and other mechanical strains, the ruptures and breakage will take place in the tubing external to the coupling rather than within the coupling.

In the use of my invention, material savings in cost are effected, not only by virtue of the fact that the end of the tube does not need to be prepared especially to receive the coupling, but also in the fact that the tubing used may in many instances be of lesser wall thickness than would otherwise be required if the tubing were to be threaded or to be connected by means of other types of couplings, thus saving in the cost of the tubing. Where reduction in weight is a factor, as in airplane construction, the coupling of my invention possesses very pronounced advantages over threaded connections and other types of couplings and joints. The fact that the tube may be readily disconnected from the body of the coupling and reconnected thereto a large number of times, and still maintain a fluid-tight and strong mechanical joint, is very advantageous in many instances where the coupling is to be used.

While I have shown only the preferred embodiments of my invention, it will be apparent to those skilled in the art that various modifications thereof may be made without departing from the spirit of my invention. For example, if it is desired further to decrease the depth of the grooves cut into the tube by the cutting edges of the sleeve, the number of cutting edges may be increased to three or more, in which case three or more grooves will be cut into the tube, but each groove will be very shallow. I therefore desire the scope of my invention to be limited only by the claims which follow.

I claim:

1. A pipe coupling comprising a pipe receiving member having a screwthreaded projection into which the end of the pipe is received, said projection having an internal inclined wall, a nut fitting over said projection and having a screwthreaded connection therewith, and a pipe engaging member projecting into the projection on the pipe receiving member and having a leading edge which normally engages the pipe, the outer face of said pipe engaging member engaging the inclined face of the pipe receiving member, said pipe engaging member being recessed on its inner face, near the said pipe engaging edge and to the rear thereof and opposite the inclined face on the pipe receiving member, the inner face of the recessed portion being normally separated from the outer face of the pipe by a space, whereby when the nut is tightened the said pipe engaging edge is forced inwardly and digs into the metal of the pipe so as to form a sealing shoulder thereon, and a second edge to the rear of said recess and which normally engages the pipe and which also digs into the metal of the pipe to form a second sealing shoulder thereon when said nut is tightened.

2. A clamping element for use with a coupling having pressure applying means and adapted to be received over the end of a length of metal pipe and pressed into biting engagement therewith comprising a continuous sleeve having an inner bore provided with a plurality of spaced independent biting edges of substantially equal diameter slightly greater than the diameter of said pipe, said edges being formed near one end of said sleeve and spaced from one another by a recess formed in said inner bore, the periphery of said sleeve being provided with conical portions adjacent its ends adapted to cooperate with said pressure applying means to force said edges inwardly to dig into the wall of said pipe and form thereon spaced sealing shoulders.

HANS KREIDEL.